March 8, 1927.

F. G. FARWELL 1,620,198

ROAD LIGHT

Filed March 25, 1926

Inventor
Fay G. Farwell

By *[signature]*
Attorney

Patented Mar. 8, 1927.

1,620,198

UNITED STATES PATENT OFFICE.

FAY G. FARWELL, OF TOLEDO, OHIO.

ROAD LIGHT.

Application filed March 25, 1926. Serial No. 97,161.

My invention has for its object to provide a swiveled automobile road light that will automatically tilt to throw its light upward according to the angle that it is turned on its swivel as it has passed a predetermined point in its angular movement. The construction is preferably such as to permit swiveled movements to cover the desirable sector in front of the automobile and when turned beyond the sector edge it will swing the light upward according to the angle that it is further turned. The invention thus provides a simple structure for controlling the road light to light a desired area in front of the automobile and yet which may be by the same actuating element turned upward to read road signs and for other purposes which require a higher elevation of light than that required for road lighting.

The invention may be contained in road lights of different forms and to illustrate a practical application of the invention I have selected a road light containing the invention as an example of such structures and shall describe it hereinafter. The road light selected is shown in the accompanying drawing.

Figure 1:
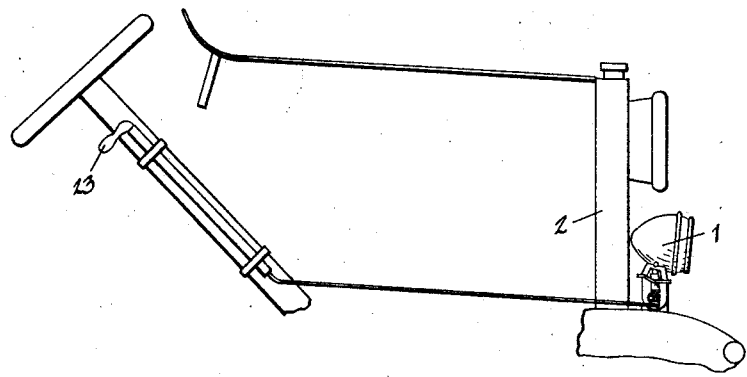

Figure 1 of the drawing illustrates an assembly view of the lamp when in position.

Figure 2:
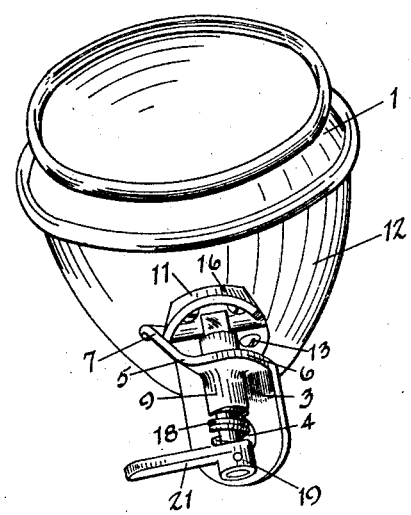
Figure 3:
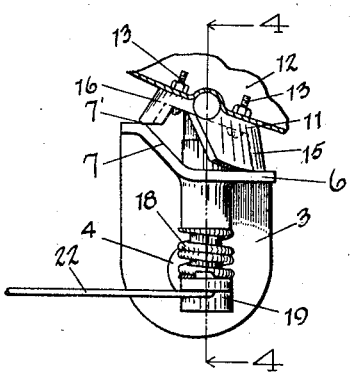
Figure 4:
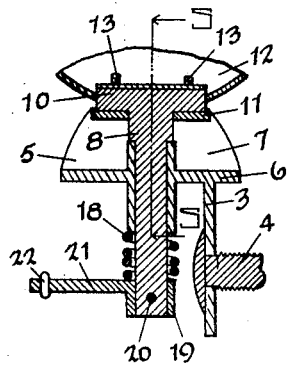
Figure 5:
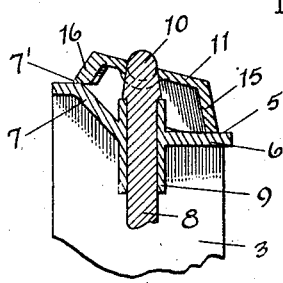

Fig. 2 illustrates a view of the lamp when tilted upward. Fig. 3 is a side view of parts of the lamp when the optical axis extends forward substantially in a horizontal plane. Fig. 4 is a view of a section taken on the plane of the line 4—4 indicated in Fig. 3. Fig. 5 is a view of a section taken on the plane of the line 5—5 indicated in Fig. 4.

In the form of construction shown in the drawing, the road light 1 is provided with a suitable means for securing it in position, preferably, in front of and near the lower end of the fender 2 of an automobile. It may be secured to a bracket that is mounted on the chassis frame or a fender or other part of an automobile. The lamp is provided with an adjustable bracket 3 that may be adjustably secured in position by means of a bolt 4 which is located substantially at right angles to the longitudinal axis of the chassis frame. This may be varied to obtain a slight right or left angle of displacement of the light as when the road lamp is located on the left side of the automobile and it is desired to direct the light normally slightly to the right side of the road.

The bracket 3 has an angular platform 5. The platform is formed of thru parts 6, 7 and 7'. The surfaces of the parts 6 and 7' are preferably located substantially horizontally while the surface of the part 7 is inclined to the surface of the part 6. Preferably it slopes upwards and rearwardly from the surface of the part 6. The part 7' extends horizontally from the upper edge of the part 7'. A pin 8 extends through the platform 5. The axis of the pin 8 is preferably vertical. The pin 8 is rotatable in a boss 9 that is formed in the platform 5 which forms a bearing for the pin. The pin has a T-head 10 and a member 11 is secured to the shell 21 of the lamp and so as to enclose the ends of the head 10 of the pin. The member 11 is secured to the shell by means of the screw bolts 13 and when it is secured in position to the shell and so as to enclose the head of the pin, the member 11 and the lamp is rotatable about the horizontal axis of the head 10 of the pin and also about the vertical axis of the pin 8, since the pin 8 may be rotated relative to the platform 5 of the bracket. The member 11 is provided with two flanges or bearing parts 15 and 16. The bearing parts 15 and 16 normally ride on the substantially horizontally located parts 6 and 7 of the platform 5. The heights of the bearing parts 15 and 16 depends upon the angle of the surface of the member 11 that makes contact with the shell 12, that is, they depend upon the angle between the vertical axis of the pin 8 and the optical axis of the lamp when in its normal position to light the road in advance of the automobile. The arrangement of the parts 6, 7, 7', 15 and 16 is such that when the light is projected by the lamp in front of the automobile the optical axis of the lamp will be substantially horizontal. When, however, the pin 8, the member 11 and the lamp is rotated, the part 15 of the member 11 will move over the surface of the portion 6 of the bracket until one of its ends strikes the inclined surface 7. At this time the part 16 will begin to descend the surface of the portion 7 of the bracket and consequently the optical axis of the lamp will be tilted upward. The area of the sector located in the front of the automobile over which the lamp may be extended by rotation of the lamp about the vertical axis of the pin before the light will be elevated will depend upon the length of the parts 15 and 16 of the member 11. If their lengths are short the angle of the sector will be large. Thus the angle of the sector is substantially proportional to the relative lengths of the parts 15 and 16 of the member 11.

Preferably the pin 8 is elastically held in position by means of a spring 18 that is located between the end of the boss 9 and a collar 19 located on the end of the pin. The collar 19 may be keyed to the pin 8 by means of a pin 20. Also the collar 19 may be provided with an arm 21 for the operation of the lamp to adjust the location of the projected rays with reference to the automobile. A rod or wire 22 may be connected to the arm 21 whereby the lamp may be operated at a point remote from the light. The wire or rod 22 may be connected to a handle 23 located conveniently near the steering wheel.

I claim:

1. In a road light, a bracket, a swiveled lamp supported on the bracket, the bracket having a plane surface and a cam surface extending from the plane surface, the lamp having a bearing member for engaging the surfaces and operating to tilt the axis of the lamp at an angle to a horizontal plane according to the position of the bearing member relative to the said surfaces.

2. In a road light, a bracket having a substantially horizontal surface and an inclined surface extending from the substantially horizontal surface, a pin rotatably supported on the bracket, a lamp oscillatably connected to the pin for movement about a substantially horizontal axis and the pin rotatably connected to the bracket for movement about a substantially vertical axis, a member connected to the lamp for engaging the bracket to tilt the lamp when the lamp is rotated a predetermined distance about the substantially vertical axis of the pin.

3. In a road light, a bracket having a substantially horizontal surface and an inclined surface extending from the substantially horizontal surface, a pin rotatably supported on the bracket, a lamp oscillatably connected to the pin for movement about a substantially horizontal axis and the pin rotatably connected to the bracket for movement about a substantially vertical axis, a member connected to the lamp and having bearing parts, a spring for pressing the bearing parts against the said surfaces of the brackets to normally locate the optical axis of the lamp in a horizontal position and to tilt the lamp as the bearing parts are engaged by one or the other of the surfaces, means for rotating the lamp and the member to shift the position of the member relative to the surfaces.

4. In a road light, a bracket having two substantially horizontal surfaces and an inclined surface extending between the two substantially horizontal surfaces, a pin rotatably supported on the bracket, a lamp oscillatably connected to the pin for movement about a substantially horizontal axis and the pin rotatably connected to the bracket for movement about a substantially vertical axis, a member connected to the lamp and having bearing parts, a spring for pressing the bearing parts against the said surfaces of the brackets to normally locate the optical axis of the lamp in a horizontal position and to tilt the lamp as the bearing parts are engaged by one or the other of the surfaces, means for rotating the lamp and the member to shift the position of the member to cause one bearing part to move from one horizontal surface to the inclined surface and the other bearing surface to shift from the other horizontal surface to the inclined surface and tilt the lamp.

In testimony whereof I have hereunto signed my name to this specification.

FAY G. FARWELL.